United States Patent
Yang et al.

(10) Patent No.: US 7,945,129 B2
(45) Date of Patent: May 17, 2011

(54) HYBRID OPTICAL SWITCH APPARATUS

(75) Inventors: Yao-Joe Yang, Taipei (TW); Bo-Ting Liao, Taipei (TW)

(73) Assignee: National Taiwan University, Taipei (TW)

( * ) Notice: Subject to any disclaimer, the term of this patent is extended or adjusted under 35 U.S.C. 154(b) by 134 days.

(21) Appl. No.: 12/318,371

(22) Filed: Dec. 29, 2008

(65) Prior Publication Data

US 2010/0074577 A1    Mar. 25, 2010

(30) Foreign Application Priority Data

Sep. 22, 2008  (TW) ................. 97136255 A

(51) Int. Cl.
*G02B 6/26* (2006.01)
*G02B 6/42* (2006.01)
(52) U.S. Cl. ............... 385/18; 385/16; 385/17; 359/872
(58) Field of Classification Search ............... None
See application file for complete search history.

(56) References Cited

U.S. PATENT DOCUMENTS

| 6,449,406 | B1 * | 9/2002 | Fan et al. ............... 385/17 |
| 6,671,449 | B1 * | 12/2003 | Yuan et al. ............ 385/135 |
| 6,894,819 | B2 * | 5/2005 | Yoon .................. 359/224.1 |

OTHER PUBLICATIONS

Liao et al, Bo-Ting, Development of A 4X4 Hybrid Optical Switch, Jun. 1-5, 2008, NSTI Nanotech 2008, Boston, Massachusetts, US.

\* cited by examiner

*Primary Examiner* — Uyen-Chau N Le
*Assistant Examiner* — Chad H Smith
(74) *Attorney, Agent, or Firm* — Bacon & Thomas, PLLC

(57) ABSTRACT

The invention relates to a hybrid optical switch, which is composed of a silicon micro-mirror-array and a mini-actuator array mainly. The invention which combines microelectromechanical systems technology and traditional precision machining technology, possesses the advantages of low cost, high accuracy, high fabrication yield, low actuation voltage, low power consumption, self-aligned micro-mirrors, and easy fiber alignment.

2 Claims, 8 Drawing Sheets

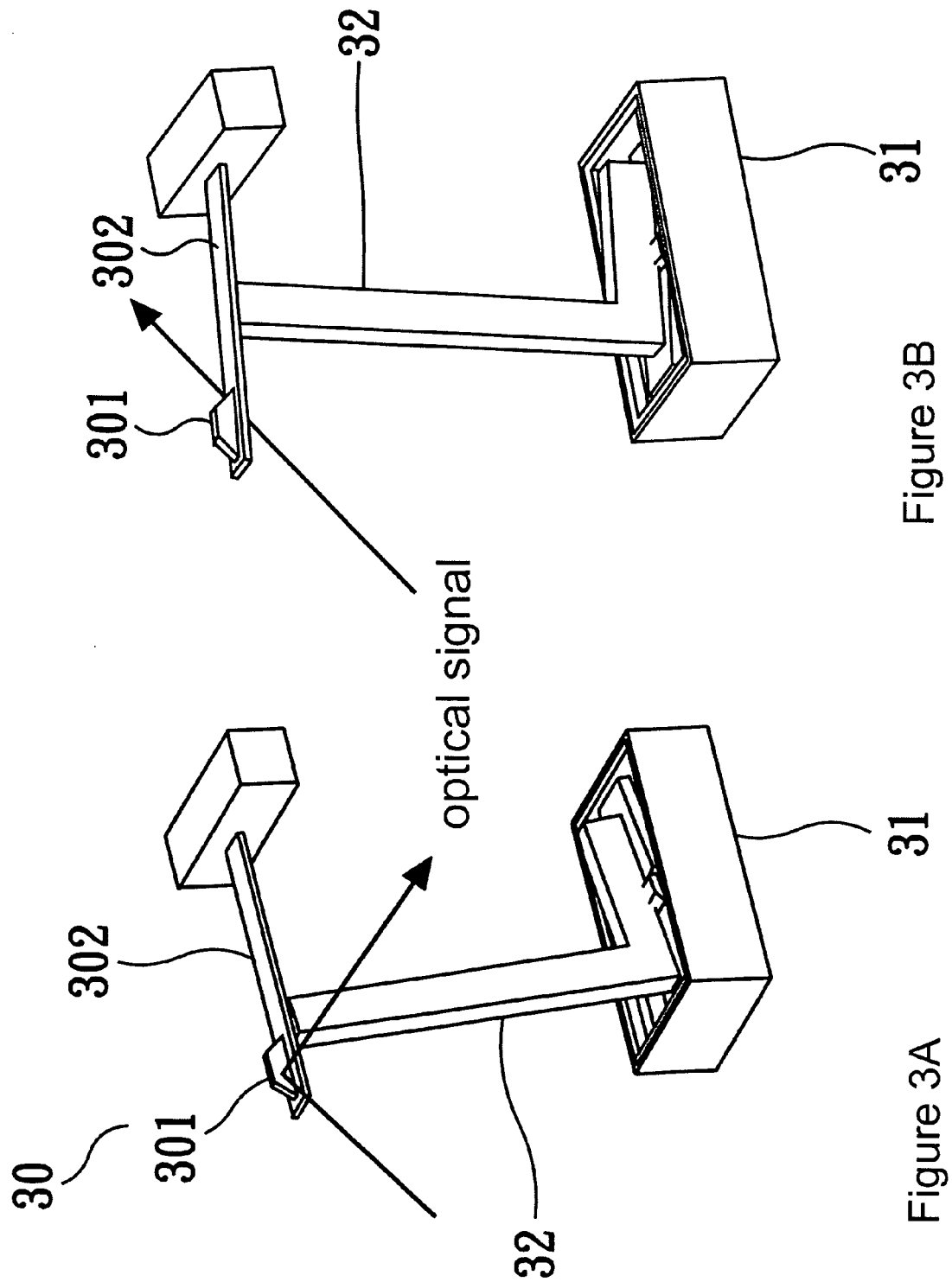

HYBRID OPTICAL SWITCH APPARATUS

BACKGROUND OF THE INVENTION

1. Field of the Invention

The invention relates to a switch apparatus, particularly to a hybrid optical switch apparatus used for optical communication network equipment.

2. Description of the Prior Art

During the past decade, the demand of the optical switching system with high stability and high capacity is greatly increased due to the flourishing development of optical communication networks. The optical cross-connect (OXC) switches are the key components for the development of high-capacity and complex optical switching systems.

Recently, the optical switching systems are developed into all-optical switching to increase the bandwidths and transmission rates. Many different techniques, such as thermo-optics, liquid crystal, and microelectromechanical systems (MEMS), have been proposed for developing the all-optical switching devices. In the above-mentioned technological field, the MEMS technology has emerged to be the leading candidate. The MEMS-based component not only has high accuracy, but also has the advantages of miniaturization, batch production, and scalability.

Silicon mirrors fabricated by using MEMS technology are widely employed for the optical applications. Deep reactive ion etching (DRIE), surface micromachining and wet anisotropic etching are the most popular micromachining techniques to fabricate the silicon mirror. DRIE technique is usually used to create high-aspect-ratio structures and is not restricted by the crystal orientation of the silicon wafer. However, DRIE technique is relatively expensive. Surface micromachining is a versatile technique to realize various opto-mechanical components. But, surface micromachining requires more fabrication steps.

In addition, wet anisotropic etching which can reduce the manufacturing cost is more suitable for fabricating silicon micro-mirror. The wet anisotropic etching technique usually can be used to fabricate vertical and smooth (111) silicon micro-mirror with a (110) silicon wafer. However, the etched shapes are strongly restricted by the crystal orientation of the silicon wafer. For example, vertical (111) mirrors and V-grooves cannot be simultaneously fabricated on a (110) silicon wafer.

Thus, in order to eliminate the drawbacks of the prior arts, it is necessary to develop a novel optical switch, which possesses the advantages of high precision, high fabrication yield, low actuation voltage, low power consumption, low cost, and easy fiber alignment.

SUMMARY OF THE INVENTION

The invention relates to a low-cost, high-precision hybrid optical switch, which is mainly composed of a silicon micro-mirror array fabricated by MEMS technology and a mini-actuator array fabricated by conventional precision machining technology.

The mini-actuator array of the invention comprises a plurality of single electromagnetic bi-stable relays integrated with L-shape arms. Each micro-mirror of the silicon micro-mirror-array structure is actuated by the mini-actuator for the reflection or pass of light beam. Because of the bi-stable actuation, the power consumption of the system can be greatly reduced. The actuation voltage is only 5 volts, so that it possesses the advantage of low actuation voltage.

The invention employs KOH wet anisotropic etching technique to fabricate silicon micro-mirror array. Silicon micro-mirror array which comprises vertical mirrors, cantilevers, and light-path trenches can be realized on a (100) silicon wafer. The vertical mirrors that are formed on {100} planes can be self-aligned with the light-path trenches along <110> direction and thus the complexity of the alignment process is possibly reduced.

The silicon micro-mirror-array structure of the invention does not have any residual stress, and the micro-mirror can reflect the optical signal accurately in order to reduce optical loss.

The silicon micro-mirror-array structure of the invention can be fabricated by the wet anisotropic etching technique, thus the fabrication process is quite simple and the fabrication yield is highly increased.

The approach of the invention can greatly reduce the fabrication cost of hybrid optical switch that possesses high accuracy, high fabrication yield, low actuation voltage, low power consumption, and easy fiber alignment Thus, the advantage and spirit of the invention can be further understood by the following detailed description and figures.

BRIEF DESCRIPTION OF THE DRAWINGS

The foregoing aspects and many of the attendant advantages of this invention will become more readily appreciated as well becomes better understood by reference to the following detailed description, when taken in conjunction with the accompanying drawings, wherein:

FIG. 3A and FIG. 3B illustrate the operational principle of the hybrid optical switch of the invention.

DESCRIPTION OF THE PREFERRED EMBODIMENT

Figure 1:
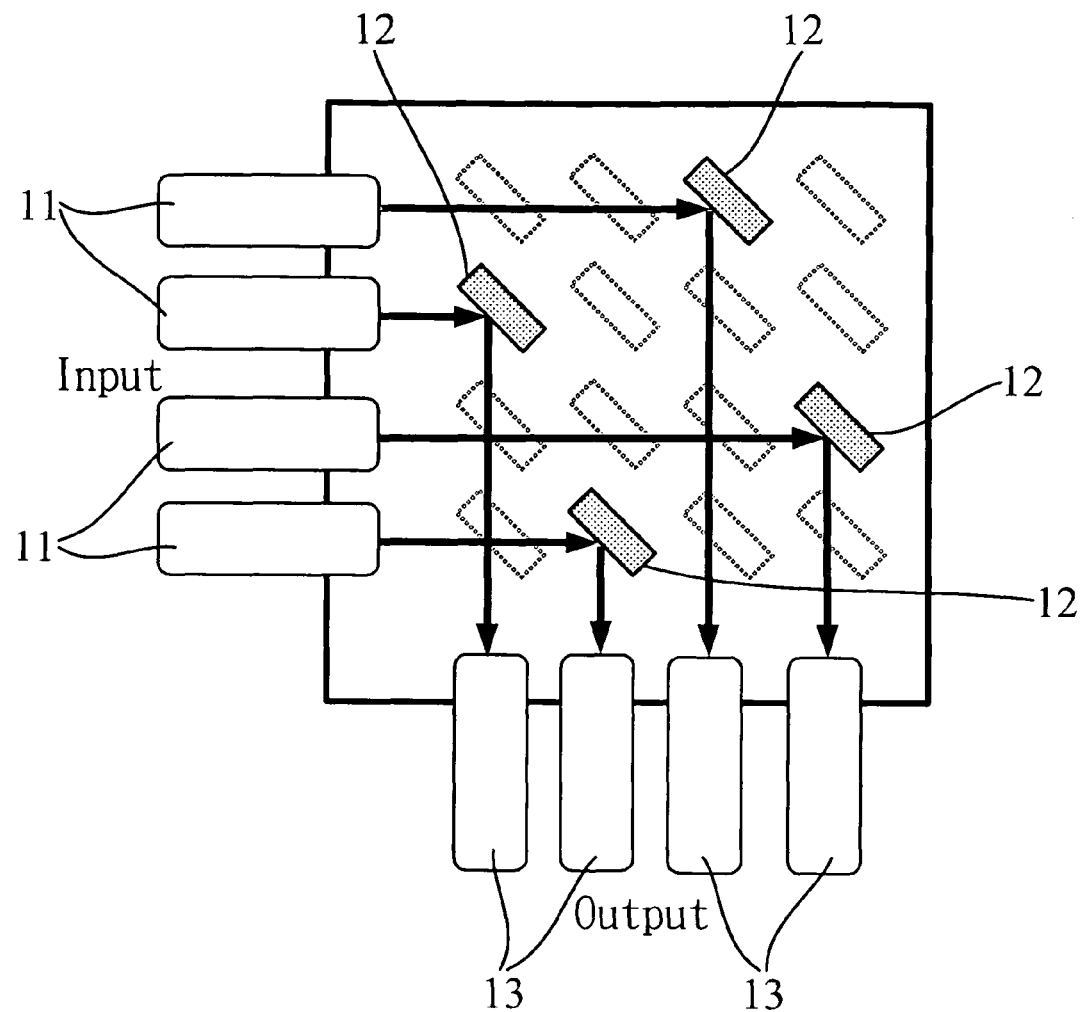
FIG. 1 illustrates the basic operation principle of the invention.

The invention relates to a hybrid optical switch, which is described in detail as the follows:

As shown in FIG. 1, a preferred embodiment for the silicon micro-mirror array of the invention is illustrated.

Referring to FIG. 1, the 4×4 hybrid optical switches are illustrated as an example mainly, but the invention can be expanded to N×N hybrid optical switches. The basic design and operational principle of the invention is illustrated in FIG. 1, including input collimator 11, micro-mirror 12 and output collimator 13. Upon operating, the optical signal is generated by the light source, and is guided from the input collimator 11. The optical signal is reflected by micro-mirror 12 and is redirected to the specific output collimator 13.

Figure 2:
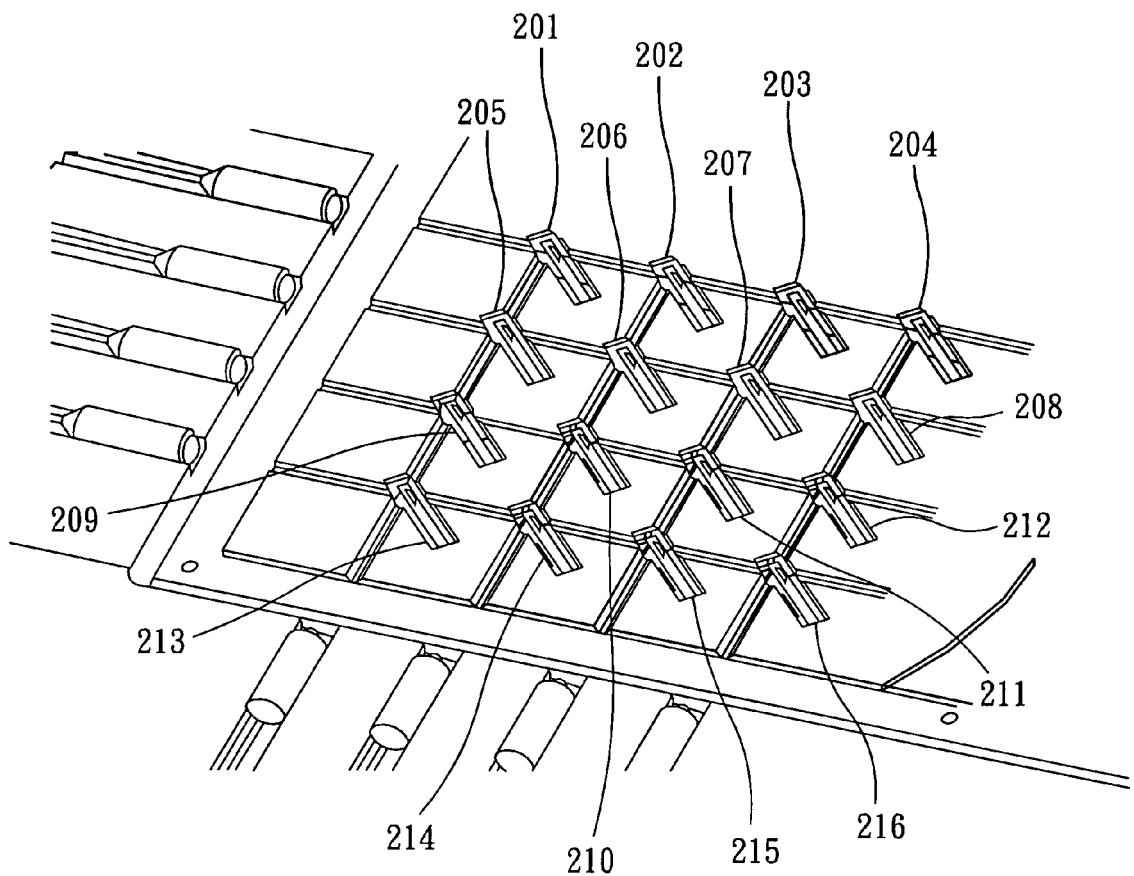
FIG. 2 illustrates a preferred embodiment for silicon micro-mirror array of the invention.

FIG. 2 illustrates the silicon micro-mirror array, including regularly aligned silicon micro-mirrors, such as silicon micro-mirror 201, silicon micro-mirror 202, silicon micro-mirror 203, silicon micro-mirror 204, silicon micro-mirror 205, silicon micro-mirror 206, silicon micro-mirror 207, silicon micro-mirror 208, silicon micro-mirror 209, silicon micro-mirror 210, silicon micro-mirror 211, silicon micro-mirror 212, silicon micro-mirror 213, silicon micro-mirror 214, silicon micro-mirror 215, and silicon micro-mirror 216. Each silicon micro-mirror structure consists of a micro-mirror, a cantilever, and light-path trenches. The function of silicon micro-mirror is to reflect the optical signal.

FIG. 3A and FIG. 3B illustrate actuator 30 of the invention. Actuator 30 is used to actuate the above-mentioned silicon micro-mirrors. Actuator 30 consists of electromagnetic bi-stable relay 31 and L-shape arm 32. The L-shape arm 32 which is glued on the electromagnetic bi-stable relay 31 is utilized to push up the silicon micro-mirror 301. Electromagnetic bi-stable relay 31 has two different stable positions.

The operational principle of the hybrid optical switch is illustrated in FIG. 3A and FIG. 3B. As shown in FIG. 3A, when the electromagnetic bi-stable relay 31 is at the first stable position, the L-shape arm 32 does not contact the cantilever 302. Since there is no residual stress inside the silicon micro-mirror structure, the silicon micro-mirror 301 is able to precisely reflect the optical signal under zero external force.

To the contrary, as shown in FIG. 3B, when electromagnetic bi-stable relay 31 is at the second stable position, cantilever 302 is pushed up by L-shape arm 32 and therefore the optical signal can pass under silicon micro-mirror 301. When the silicon micro-mirror 301 is pushed up by the L-shape arm 32, it can retain at the second stable position without consuming any electrical power due to the bi-stability of the relay. Since L-shape arm 32 only pushes silicon micro-mirror 301 away from the light path, any misalignment between L-shape arm 32 and cantilever 302 will not affect the optical performance of the switch. Thus, the complexity of the packaging process of actuator 30 can be reduced, in order to reach the purpose of cost saving.

Figure 4A:
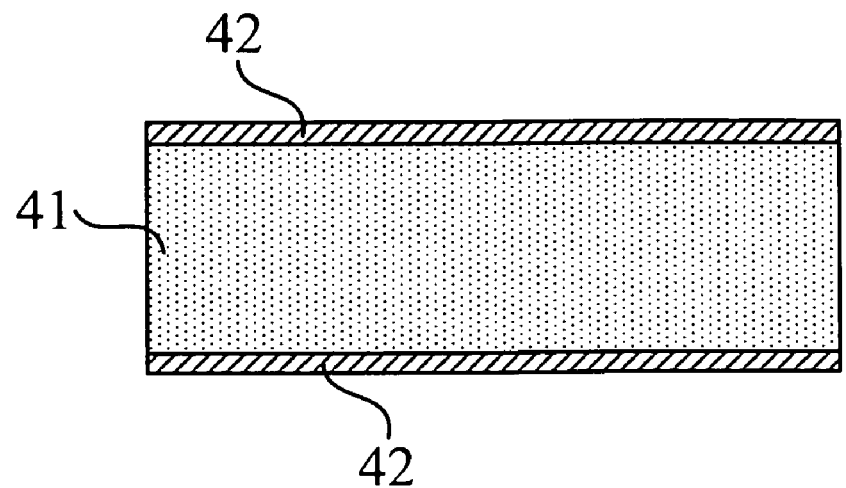
FIG. 4A and through FIG. 4F illustrate the fabrication process of silicon micro-mirror-array structure of the invention.

As shown in FIG. 4A through FIG. 4F, the fabrication process of the silicon micro-mirror-array structure is illustrated:

FIG. 4A illustrates that silicon nitride layer 42 is deposited on (100) silicon wafer 41.

Figure 4B:
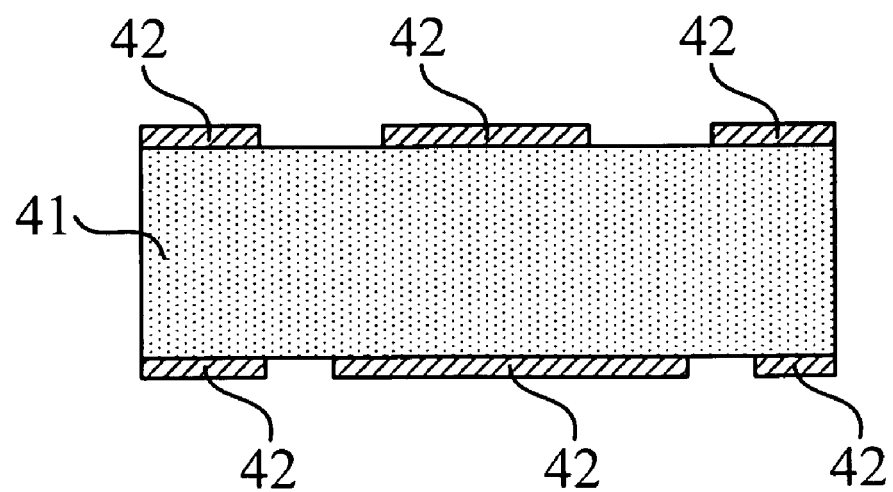

FIG. 4B illustrates that the lithography process is conducted on the both sides of silicon wafer 41, wherein the pattern is transferred by the reactive ion etching.

Figure 4C:
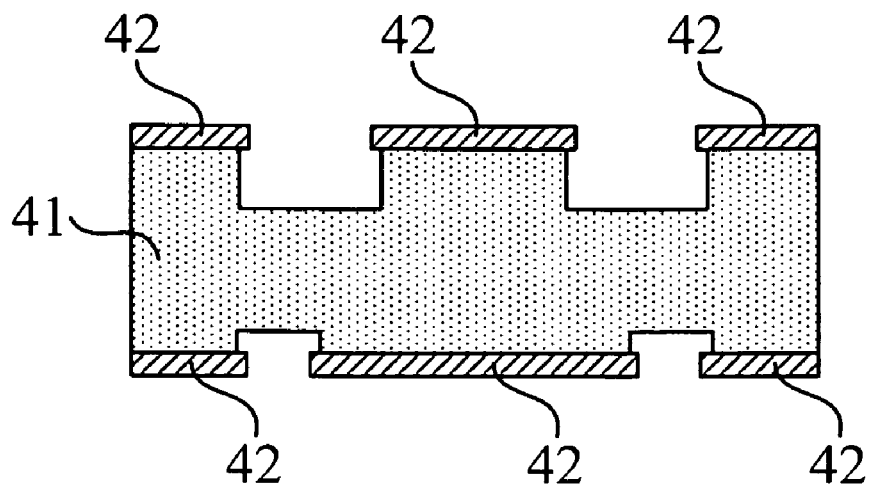

FIG. 4C illustrates that the KOH wet etching process is conducted on silicon wafer 41.

Figure 4D:
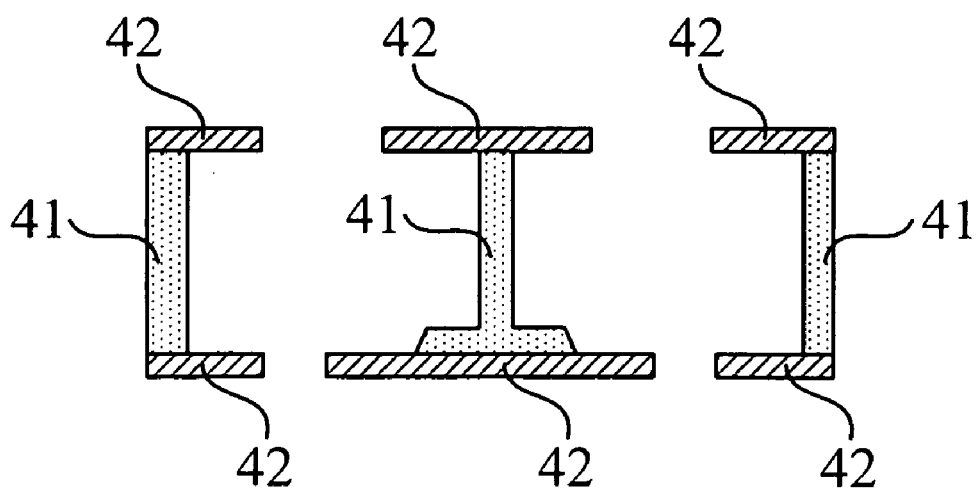

FIG. 4D illustrates the device structure is fabricated on silicon wafer 41 after the KOH wet etching process.

Figure 4E:
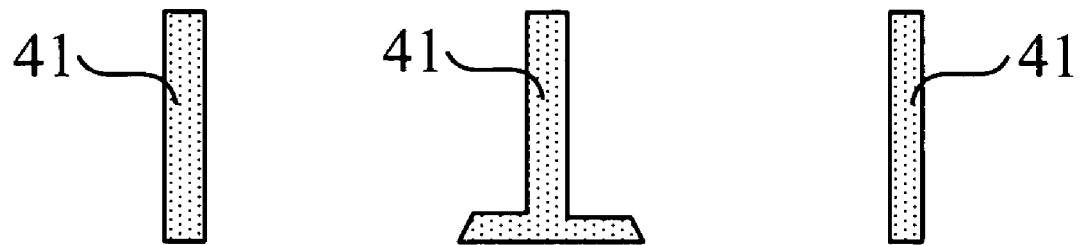

FIG. 4E illustrates that residual silicon nitride layer 42 is removed from silicon wafer 41 by using the phosphoric acid.

Figure 4F:
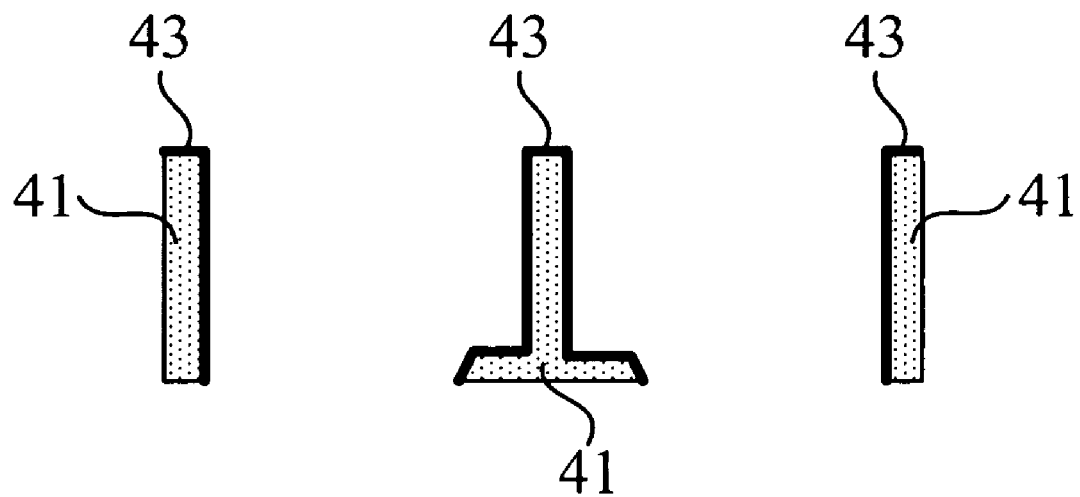

FIG. 4F illustrates that the sputtering process is conducted on silicon wafer 41, wherein gold layer 43 is deposited on silicon wafer 41 to increase the reflectivity of mirror.

Figure 5:
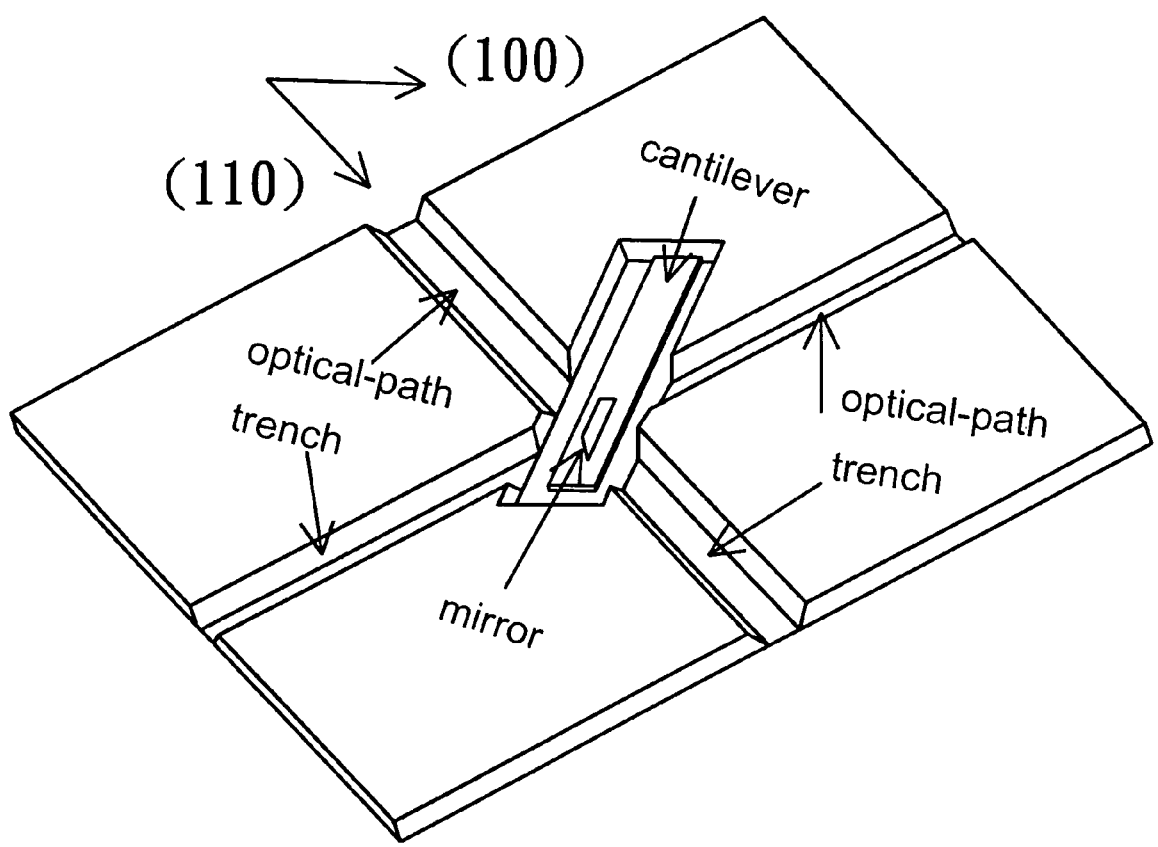
FIG. 5 illustrates the diagram of the fabricated silicon micro-mirror-array structure of the invention.

FIG. 5 illustrates the diagram of the fabricated silicon micro-mirror-array structure, which includes vertical mirror, cantilever, and optical-path trenches. The mask openings of the mirror is designed to be aligned with the (100) direction, and the mask patterns of the light-path trenches are aligned with the (110) direction. Meantime, the mask opening of a cantilever is designed on the backside of the wafer to support the micro-mirror. Because the angle between (100) and (110) crystallographic directions is 45°, the surface of the etched vertical mirror can be self-aligned with the optical-path trench. Therefore, the alignment of the collimator during the packaging process is possibly simplified.

Figure 6:
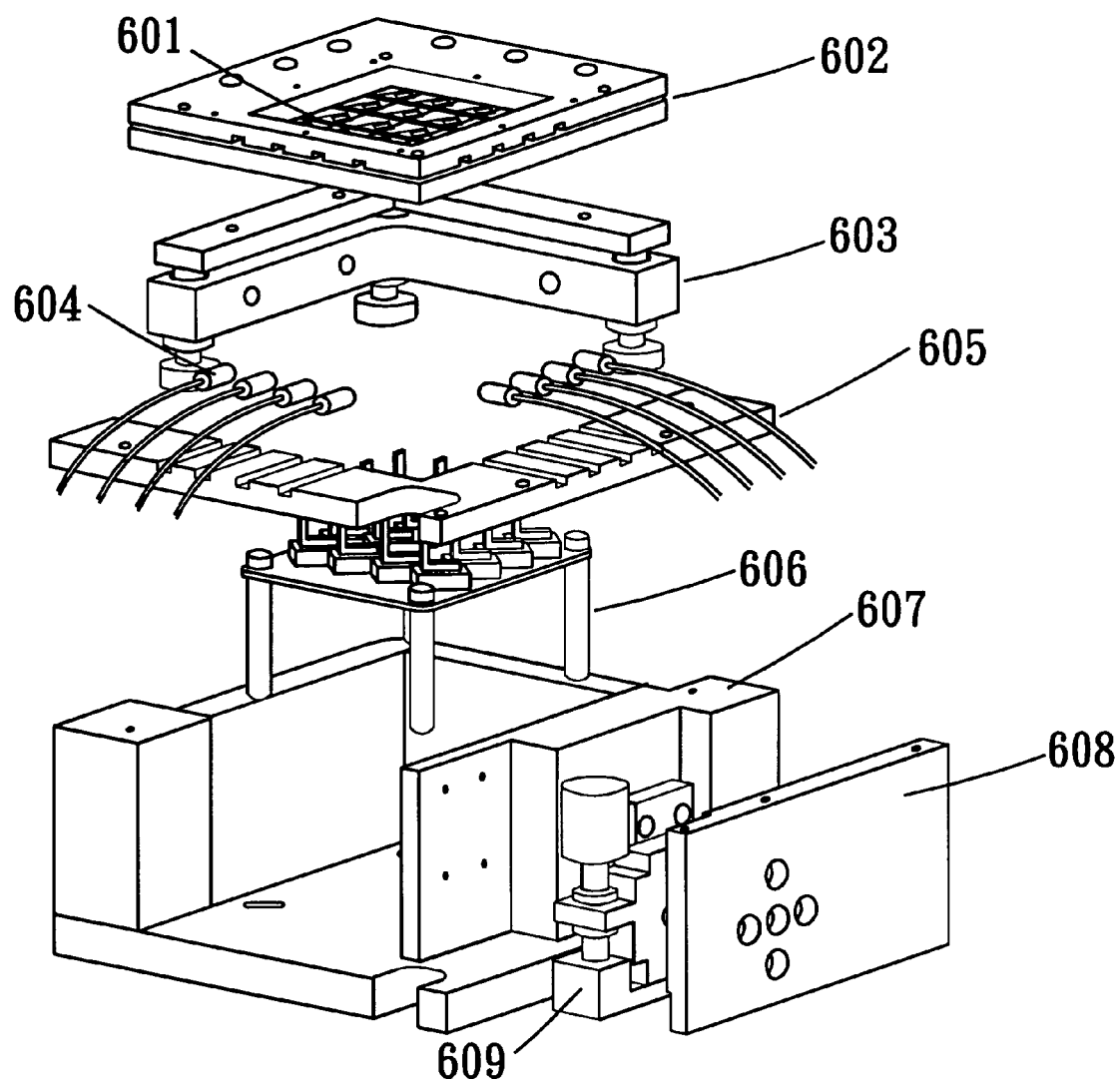
FIG. 6 illustrates the exploded view of hybrid optical switch of the invention.

FIG. 6 illustrates the exploded view of the hybrid optical switch, and the components are described as follows:

Silicon micro-mirror array 601 is held by silicon micro-mirror-array holder 602. Silicon micro-mirror-array holder 602 is fixed on alignment stage 603. Mini-actuator array 606 is installed underneath silicon micro-mirror array 601. Collimator array 604 is mounted on collimator platform 605. Collimator platform 605 is supported by collimator platform support 608. Collimator platform support 608 is fixed on collimator stage 609. Housing 607 is used to contain the above-mentioned components.

The actuator can be switched between two stable positions with an input voltage of 5 V. Thus the hybrid optical switch of the invention has the advantage of low actuation voltage. In addition, due to silicon micro-mirror in silicon micro-mirror array has the self-aligned characteristics, the difficulty for the alignment of collimator can be possibly reduced.

In summary, the hybrid optical switch of the invention is composed of silicon micro-mirror-array structure and mini-actuator array. Silicon micro-mirror-array structure is realized by the microelectromechanical systems technology, and the mirror has the advantages of self-aligned function and high precision. The low-cost wet anisotropic silicon etching technique that is employed in the invention greatly reduces the complexity of the fabrication process, and thus gives higher fabrication yield.

The mini-actuator array of the invention is fabricated by the precision machining technology. The low-cost electromagnetic bi-stable relay is used to obtain the advantages of low activation voltage and bi-stable actuations. Thus, the hybrid optical switch disclosed in the invention has practical, innovative, and advanced properties compared to the traditional optical switch.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

The invention claimed is:

1. A hybrid optical switch apparatus, comprising:
   a silicon micro-mirror array;
   a silicon micro-mirror-array holder;
   an alignment stage;
   a collimator array;
   a collimator platform;
   an actuator array formed by a plurality of actuators, each actuator comprising:
      an electromagnetic bi-stable relay having two stable states; and
      a L-shape arm; wherein the L-shape arm is glued on the electromagnetic bi-stable relay to form the actuator;
   a housing;
   a collimator platform support; and
   a collimator stage; wherein the silicon micro-mirror array is held by the silicon micro-mirror-array holder, the silicon micro-mirror-array holder is fixed on the alignment stage, the actuator array is installed underneath the silicon micro-mirror array, the collimator array is mounted on the collimator platform, the collimator platform is supported by the collimator platform support, the collimator platform support is fixed on the collimator stage, and the housing is used to form the hybrid optical switch apparatus.

2. The apparatus according to claim 1, wherein the silicon micro-mirror array comprises a metal mirror array.

* * * * *